United States Patent
B S et al.

(10) Patent No.: US 10,275,327 B2
(45) Date of Patent: Apr. 30, 2019

(54) VIRTUAL FIBRE CHANNEL PORT MIGRATION

(71) Applicant: HEWLETT PACKARD ENTERPRISE DEVELOPMENT LP, Houston, TX (US)

(72) Inventors: Sumangala B S, Bangalore (IN); Sreenivasa Prasad V, Bangalore (IN); Paulose Kuriakose Arackal, Bangalore (IN)

(73) Assignee: Hewlett Packard Enterprises Development LP, Houston, TX (US)

( * ) Notice: Subject to any disclaimer, the term of this patent is extended or adjusted under 35 U.S.C. 154(b) by 136 days.

(21) Appl. No.: 15/398,954

(22) Filed: Jan. 5, 2017

(65) Prior Publication Data
US 2018/0189152 A1    Jul. 5, 2018

(51) Int. Cl.
*G06F 11/00*     (2006.01)
*G06F 11/20*     (2006.01)
*G06F 13/42*     (2006.01)

(52) U.S. Cl.
CPC ........ *G06F 11/2007* (2013.01); *G06F 13/426* (2013.01); *G06F 2201/805* (2013.01); *G06F 2201/815* (2013.01)

(58) Field of Classification Search
CPC .... H04L 67/327; H04L 69/40; G06F 11/2033; G06F 2009/4557; G06F 3/0635; G06F 9/45533; G06F 9/4856; G06F 13/102; G06F 9/45558; G06F 9/541
See application file for complete search history.

(56) References Cited

U.S. PATENT DOCUMENTS

| | | | |
|---|---|---|---|
| 7,543,081 B2 | 6/2009 | Dugan et al. | |
| 7,633,955 B1* | 12/2009 | Saraiya | H04L 49/356 370/395.31 |
| 7,721,150 B2 | 5/2010 | Belyakov et al. | |
| 7,739,543 B1* | 6/2010 | Pittman | G06F 11/006 709/208 |
| 7,933,993 B1* | 4/2011 | Skinner | G06F 9/5077 709/209 |
| 7,979,701 B1* | 7/2011 | Gandhasri | G06F 21/602 713/165 |

(Continued)

OTHER PUBLICATIONS

Cook, R., "Multipath I/O: Guarantee Redundancy During HBA Failure (Almost!)," (Research Paper) Nov. 7, 2006, 6 pages, available at http://searchstorage.techtarget.com/tip/Multipath-I-O-Guarantee-redundancy-during-HBA-failure-almost.

*Primary Examiner* — Loan L. T. Truong
(74) *Attorney, Agent, or Firm* — Hewlett Packard Enterprises Patent Department

(57) ABSTRACT

Examples disclosed herein relate to virtual Fiber Channel port migration. In some examples disclosed herein, a failure in a primary physical host bus adapter (HBA) hosting a plurality of virtual HBA ports assigned to a virtual machine may be detected. In response to the detecting, incoming input/output (I/O) requests from the virtual machine may be placed into a wait queue, and the plurality of virtual HBA ports may be migrated to a backup physical HBA. After the plurality of virtual HBA ports have been migrated to the backup physical HBA, the I/O requests in the wait queue may be transferred to an active queue to be processed using the plurality of virtual HBA ports registered on the backup physical HBA.

20 Claims, 5 Drawing Sheets

(56) References Cited

U.S. PATENT DOCUMENTS

| | | | | |
|---|---|---|---|---|
| 8,041,987 B2* | 10/2011 | Allen | | G06F 11/2005 |
| | | | | 714/4.11 |
| 8,281,305 B2 | 10/2012 | Otani | | |
| 8,375,111 B2* | 2/2013 | Otani | | G06F 3/0605 |
| | | | | 709/220 |
| 8,719,534 B1* | 5/2014 | Ray, III | | G06F 3/067 |
| | | | | 711/154 |
| 8,937,965 B2 | 1/2015 | Shimozono et al. | | |
| 9,641,389 B2* | 5/2017 | Kothari | | H04L 41/0846 |
| 9,817,732 B1* | 11/2017 | Fair | | G06F 11/2007 |
| 9,830,239 B2* | 11/2017 | Nazari | | G06F 11/2094 |
| 9,973,446 B2* | 5/2018 | Cohen | | H04L 49/351 |
| 2004/0151188 A1* | 8/2004 | Maveli | | H04L 12/4641 |
| | | | | 370/398 |
| 2009/0282142 A1* | 11/2009 | Tamura | | G06F 9/4416 |
| | | | | 709/223 |
| 2010/0293552 A1* | 11/2010 | Allen | | G06F 9/5077 |
| | | | | 718/105 |
| 2011/0239014 A1* | 9/2011 | Karnowski | | G06F 1/3209 |
| | | | | 713/320 |
| 2011/0239213 A1* | 9/2011 | Aswani | | G06F 9/45558 |
| | | | | 718/1 |
| 2012/0131375 A1* | 5/2012 | Adda | | G06F 11/0793 |
| | | | | 714/2 |
| 2012/0311566 A1* | 12/2012 | Takaoka | | H04L 41/5035 |
| | | | | 718/1 |
| 2013/0254404 A1* | 9/2013 | Johnsen | | G06F 9/45533 |
| | | | | 709/226 |
| 2013/0263130 A1* | 10/2013 | Sugihara | | G06F 9/455 |
| | | | | 718/1 |
| 2014/0222958 A1* | 8/2014 | Bostick | | H04L 41/00 |
| | | | | 709/217 |
| 2014/0317437 A1* | 10/2014 | LeFevre | | G06F 11/2033 |
| | | | | 714/4.11 |
| 2014/0317441 A1* | 10/2014 | Arata | | G06F 11/20 |
| | | | | 714/4.12 |
| 2015/0006949 A1* | 1/2015 | Bittles | | G06F 11/2007 |
| | | | | 714/4.11 |
| 2015/0052535 A1* | 2/2015 | Fujii | | G06F 9/46 |
| | | | | 718/104 |
| 2015/0269039 A1* | 9/2015 | Akirav | | G06F 11/2007 |
| | | | | 714/4.11 |
| 2015/0370611 A1* | 12/2015 | Amann | | G06F 9/5088 |
| | | | | 709/216 |
| 2015/0370668 A1* | 12/2015 | Nazari | | H04L 41/0668 |
| | | | | 714/6.3 |
| 2016/0019097 A1* | 1/2016 | Saito | | G06F 9/5077 |
| | | | | 709/226 |
| 2016/0352869 A1* | 12/2016 | Liddicott | | H04L 69/162 |
| 2017/0324665 A1* | 11/2017 | Johnsen | | H04L 47/20 |

* cited by examiner

VIRTUAL FIBRE CHANNEL PORT MIGRATION

BACKGROUND

A virtualization services platform may provide hardware and software resources for virtual machine guests. N-Port ID virtualization (NPIV) can be used to create a plurality of virtual host bus adapter (HBA) ports on a physical Fibre Channel HBA that may be assigned to virtual machine guests on the virtual services platform. Each virtual machine guest may access storage devices using a virtual Fibre Channel HBA via the assigned virtual HBA ports on the physical HBA.

BRIEF DESCRIPTION OF THE DRAWINGS

The following detailed description references the drawings, wherein.

DETAILED DESCRIPTION

Figure 1:
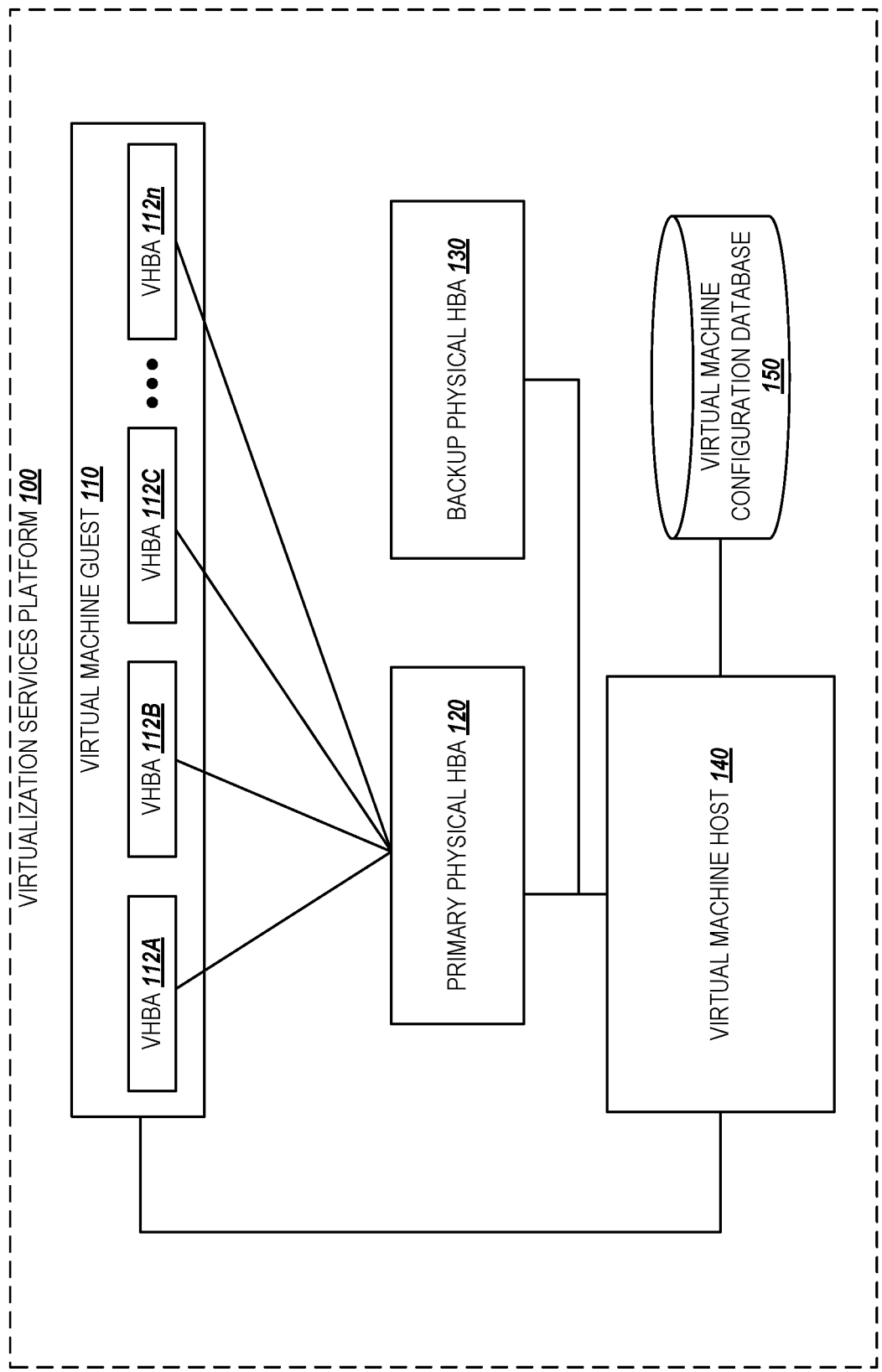
FIG. 1 is a block diagram of an example virtualization services platform for virtual Fibre Channel port migration.

In the event of a failure in the physical HBA of a virtualization services platform, the storage devices behind the physical HBA may become inaccessible to the hosted virtual machine guests. One implementation to mitigate the effects of a physical HBA failure may include multipathing. Multipathing may include providing multiple paths to the storage devices via alternate virtual HBA ports with unique world wide names (WWNs) and active login sessions. Multipathing, however, may be an inefficient solution for various reasons. For example, multipathing may inefficiently use physical HBA resources by keeping multiple redundant virtual HBA ports open all the time—which can lead to active target login sessions there by reducing the total capable login sessions at the target. Under these circumstances, when there is registered state change notification (RSCN), such as a change in the storage area network because of node joining or leaving the fabric, the alternate virtual HBA ports in the multipathing solution will also process the RSCN which causes additional overheads in terms of performance.

Examples disclosed herein describe technical solutions to these technical challenges for virtual Fibre Channel port migration. In the disclosed examples, failures in physical HBAs of a virtualization services platform may be mitigated without the use of redundant virtual HBA port WWNs and login sessions. A virtualization services platform may include a primary physical HBA and a backup physical HBA. Virtual HBA ports may be carved out of the primary physical HBA and assigned to a virtual machine. In the event of a failure in the primary physical HBA, a virtual machine host of the virtualization services platform may seamlessly migrate the virtual HBA ports of the primary physical HBA to the backup physical HBA by placing any incoming input/output (I/O) requests in a wait queue, unregistering the virtual HBA ports from the primary physical HBA and registering them onto the backup physical HBA. Once the migration is complete, the virtual machine host may transfer the I/O requests in the wait queue into an active queue so that they may continue being processed by the platform. Due to the speed and efficiency of the migration, the primary physical HBA failure may result in little to no impact to the virtual machine guest.

Reference will now be made to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is a block diagram of an example virtualization services platform 100 for virtual Fibre Channel port migration. A virtualization services platform, as used herein, may refer to computing systems capable of providing hardware and software/firmware resources for hosting virtual machine guests. For example, virtualization services platform 100 may be a server device such as a blade server, rack-mount server, or stand-alone server; by a personal computing device, such as a desktop computer, laptop computer, a virtual appliance, or other computing systems. Virtualization services platform 100 may be implemented by a single computing system or by a plurality of computing systems, such as a cloud computing system, cluster computing system, or distributed computing system.

As shown in FIG. 1, virtualization services platform 100 may include various components, such as a virtual machine guest 110, a plurality of physical host bus adapters (e.g., primary physical HBA 120 and backup physical HBA 130), a virtual machine host 140, and virtual machine configuration database 150. The number and arrangement of these components is an example only and provided for purposes of illustration. Other arrangements and numbers of components may be utilized without departing from the examples of the present disclosure. For example, virtualization services platform 100 may include a plurality of virtual machine guests and additional HBAs.

In some examples, virtual machine guest 110, primary physical HBA 120, backup physical HBA 130, and virtual machine host 140 may be each be implemented by a computing system or computing systems, may be implemented by the same computing system or computing systems, and/or may be implemented by a subset of the computing system or computing systems implementing virtualization services platform 100. For example, virtual machine guest 110, primary physical HBA 120, backup physical HBA 130, and virtual machine host 140 may be implemented by a computing system, such as a virtual appliance, that includes a processor, such as a central processing unit (CPU), a dedicated integrated circuit such as an ASIC (application-specific integrated circuit), or a dedicated FPGA (field-programmable gate array). The processor may be a single processor or a plurality of processor hosts. In some examples, virtual machine guest 110, primary physical HBA 120, backup physical HBA 130, and virtual machine host 140 may be implemented as a combination of electronic circuitry (i.e., hardware) and software/firmware included in virtualization services platform 100 that implements the functionality of virtual machine guest 110, primary physical HBA 120, backup physical HBA 130, and virtual machine host 140. For example, virtualization services platform 100 may include a processor that executes instructions (e.g., stored on a machine-readable storage medium of virtualization services platform 100) to offer the functionality of virtual machine guest 110, primary physical HBA 120, backup physical HBA 130, and virtual machine host 140. The machine-readable storage medium may be a non-transitory storage medium such as an optical disc, a hard disk drive (HDD), a solid state drive (SSD), or a non-volatile memory (e.g., electrically erasable read-only memory (EEPROM), non-volatile random access memory (NVRAM), flash memory, etc.).

Virtual machine configuration database 150 may be implemented by a flat file or an electronic database system or a plurality of logically and/or physically separate electronic database systems capable of storing electronic data, and may be accessed using methods such as data entry, data transfer, data uploading, etc.

Virtual machine guest 110 may be a virtual machine capable of emulating various types of computing systems such that operating systems and applications may be executed thereon. Virtual machine guest 110 may, among other things, access storage devices (e.g., read from and write to) behind the host bus adapters (e.g., primary physical HBA 120) of virtualization services platform 100. Primary physical HBA 120 and backup physical HBA 130 may be Fibre Channel host bus adapters and may interconnect and provide networking functionality for components of virtualization services platform 100, and may provide connections to components and systems external to virtualization services platform 100 for the components of virtualization services platform 100.

Primary physical HBA 120 and backup physical HBA 130 may each have a plurality of unique WWNs assigned to their physical ports. As stated above, N-Port ID virtualization allows for a plurality of virtual host bus adapter (HBA) ports to be created on a physical host bus adapter. Each physical HBA port may be partitioned into a plurality of virtual HBA ports, and each of the virtual HBA ports may be assigned to one of a plurality of virtual HBAs of virtual machine guest 110 (e.g., VHBA 112A-112n). Virtual machine guest 110 may communicate to various storage devices behind the physical HBAs of virtualization services platform 100 on the assigned virtual HBA ports using VHBA 112A-112n.

Virtual machine host 140 may manage various aspects of virtual machine 110, primary physical HBA 120, and backup physical HBA 130. In some implementations, virtual machine host 140 may be a virtual machine hypervisor that controls the hardware and software resources of virtualization services platform 100, and creates, runs, and manages the execution of virtual machine guests on virtualization services platform 100. Virtual machine host 140 may manage the creation and operation of virtual HBA ports on primary physical HBA 120 and backup physical HBA 130. For example, virtual machine host 140 may send requests to primary physical HBA 120 to create virtual HBA ports thereon and assign the created virtual HBA ports to virtual machine guests (e.g., virtual machine guest 110) created on virtualization services platform 100.

Virtual machine host 140 may maintain a database (e.g., virtual machine configuration database 150) of information associated with virtual HBA ports on primary physical HBA 120 and backup physical HBA 130. The information may include, for example, a mapping of active and backup virtual HBA device IDs assigned to each virtual machine guest on virtualization services platform 100.

In some implementations, primary physical HBA 120 may experience failures that may cause outages in the availability of virtual HBA ports created primary physical HBA 120. The outages may result in virtual machine guest 110 (and other virtual machine guests) being unable to access storage devices through primary physical HBA 120.

To minimize virtual HBA port downtime, and to ensure continuous access of storage devices by virtual machine 110, virtual machine host 140 may detect failures in primary physical 120 and, in response, migrate the virtual HBA ports on failing primary physical 120 to backup physical HBA 130. In some implementations, backup physical HBA 130 may have similar specifications and functionality as primary physical HBA 120. For example, primary physical HBA 120 and backup physical HBA 130 may each be NPIV capable, may operate at similar bandwidth or speed, etc. Backup physical HBA 130 may also be sized such that it is capable of accommodating migration of all virtual HBA ports from primary physical HBA 120.

In some implementations, virtual machine host 140 may detect failures in primary physical HBA 120 based on asynchronous notifications received from primary physical HBA 120. For example, primary physical HBA 120 may poll device-specific registers to identify events, and send the events to virtual machine host 140. The event may be a notification of a failed attempt to process an I/O request from virtual machine guest 110. The event may identify a reason for the failed attempt, such as a time out in the processing of the I/O request.

Virtual machine host 140 may take various actions in response to detecting a failure in primary physical HBA 120. In some implementations, virtual machine host 140 may place all incoming I/O requests (i.e., I/O requests received after the failure has been detected) from virtual machine guest 110 into a wait queue in response to detecting the failure. In some implementations, virtual machine host 140 may return non-retriable error notifications to virtual machine 110 for all received I/O requests (i.e., I/O requests received prior to the failure has been detected) from virtual machine guest 110 in response to detecting the failure.

Either concurrently with, or after, all incoming I/O requests being placed into the wait queue, virtual machine host 140 may migrate virtual HBA ports on the failing primary physical HBA 120 to backup physical HBA 130. In some implementations, virtual machine host 140 may migrate the virtual HBA ports by unregistering the virtual HBA ports from primary physical HBA 120 and registering the plurality of virtual HBA ports onto backup physical HBA 130. Virtual machine host 140 may unregister and register the virtual HBA ports by sending requests to primary physical HBA 120 and backup physical HBA 130 to unregister and register, respectively, the WWNs assigned to the virtual HBA ports. Virtual machine host 140 may also update the mapping of the virtual HBA ports in virtual machine configuration database 150 to reflect the migration of the virtual HBA ports. For example, virtual machine host 140 may update virtual machine configuration database 150 to reflect that the virtual HBA ports are no longer assigned to ports on primary physical HBA 120 and are now assigned to ports on backup physical HBA 130.

In some implementations, primary physical HBA 120 may be unable to successfully clean up (i.e., unregister) the virtual HBA ports assigned to it in response to a request from virtual machine host 140 to unregister the virtual HBA ports. In response to determining that primary physical HBA 120 in unable to unregister the virtual HBA ports successfully (e.g., by receiving a return status indicating an unsuccessful attempt or a time out in processing the request), virtual machine host 140 may provide instructions to primary physical HBA 120 to reset primary physical HBA 120.

After the virtual HBA ports have been successfully migrated (i.e., registered) to backup physical HBA 130, virtual machine host 140 may transfer the incoming I/O requests in the wait queue to an active queue so that they may continue to be processed using the virtual HBA ports now registered on backup physical HBA 130, thereby ensuring continuity of service. Moreover, virtual machine host 140 may provide a notification to virtual machine guest 110 that the virtual HBA ports are back online and available after the virtual HBA ports have been migrated to backup physical HBA 130 such that virtual machine guest 110 may send new I/O requests for processing.

Figure 2:
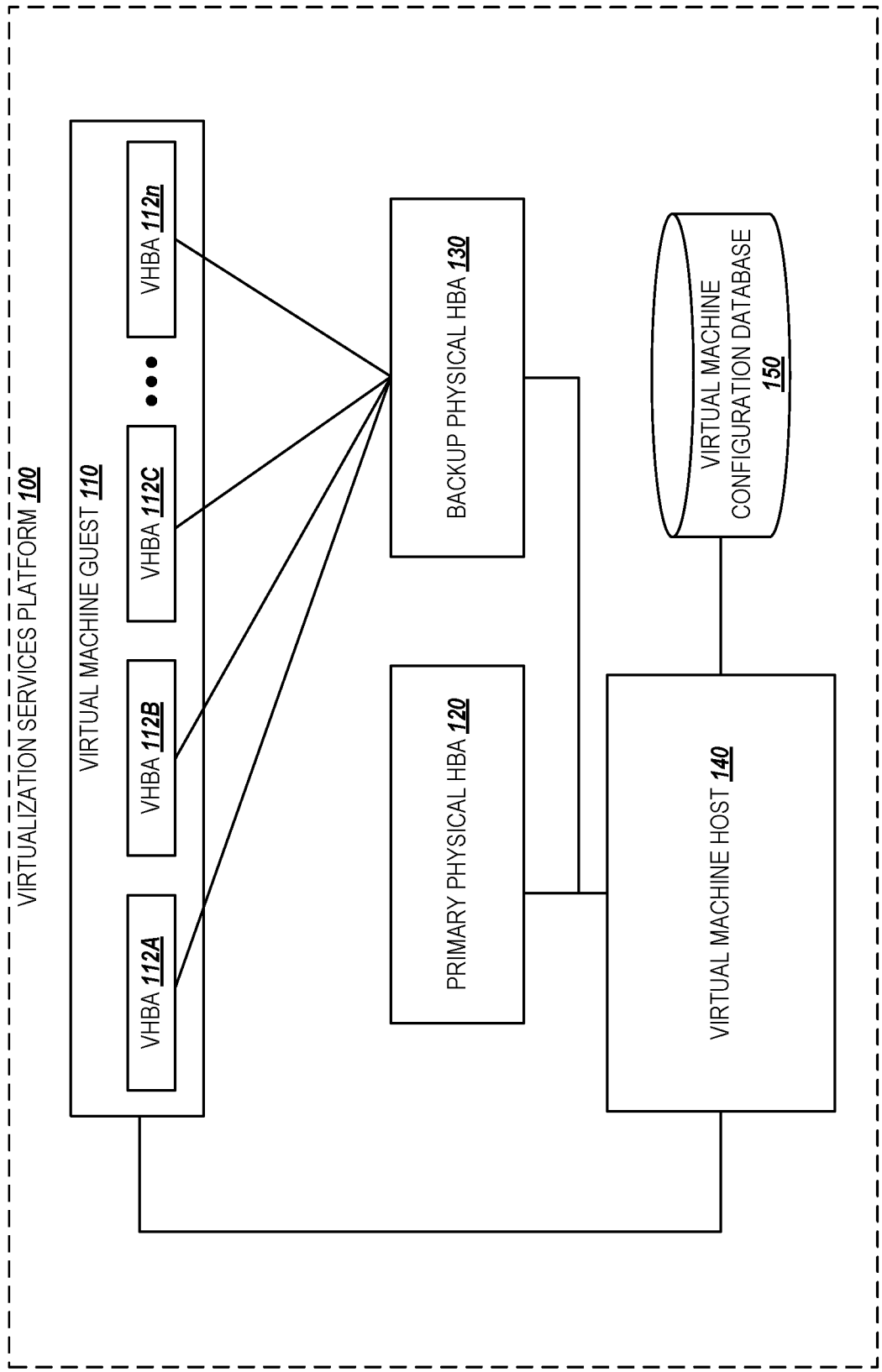
FIG. 2 is a block diagram of an example virtualization services platform for virtual Fibre Channel port migration.

FIG. 2 is a block diagram of an example configuration of virtualization services platform 100 once the virtual HBA ports of primary physical HBA 120 have been migrated to backup physical HBA 130. As shown in FIG. 2, VHBA 112A-112n of virtual machine guest 110 are now connected to backup physical HBA 130 via the same virtual HBA ports assigned to virtual machine guest 110. Accordingly, migrating the virtual HBA ports from primary physical HBA 120 to backup physical HBA 130 eliminates the need for virtual machine guest 110 (or other components in or external to virtualization services platform 100) update any configuration information associated with the virtual HBA ports. Virtual machine guest 110 may continue to access storage devices behind backup physical HBA 130 using the same virtual HBA port IDs.

Figure 3:
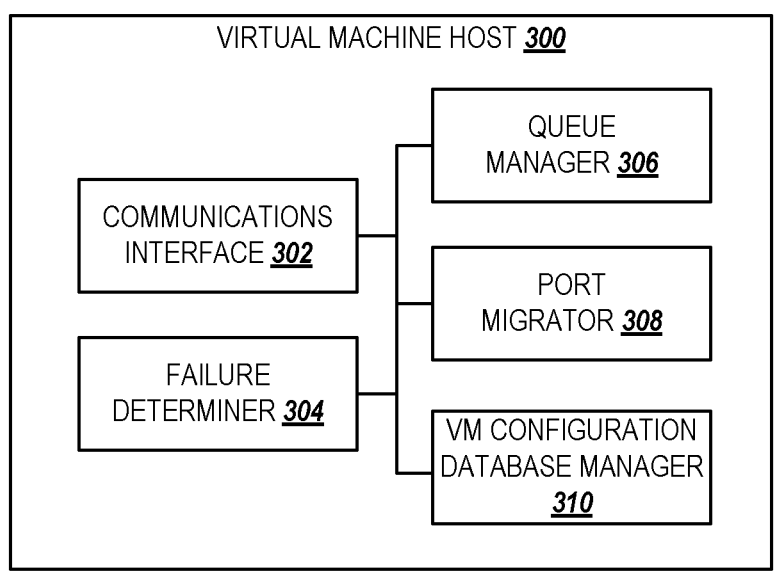
FIG. 3 is a block diagram of an example virtual machine host for virtual Fibre Channel port migration.

FIG. 3 is a block diagram of an example virtual machine host 300 for virtual Fibre Channel port migration. In some implementations, virtual machine host 300 may be used to implement virtual machine host 140 of FIGS. 1 and 2, and the functionalities described above. In some implementations, virtual machine host 300 may be included in a virtualization services platform (e.g., virtualization services platform 100 of FIGS. 1 and 2).

As shown in FIG. 3, virtual machine host 300 may include various components, such as a communications interface 302, a failure determiner 304, a queue manager 306, a port migrator 308, and a virtual machine configuration database manager 310. Virtual machine host 300, and each of components 302-310 included therein, may be implemented as hardware or a combination of hardware and software/firmware similarly as described above regarding virtual machine host 140 of FIGS. 1 and 2, generally. The number and arrangement of these components is an example only and provided for purposes of illustration. Other arrangements and numbers of components may be utilized without departing from the examples of the present disclosure.

Communications interface 302 may be implemented as wired or wireless networking interface, as an application programming interface (API), a communications bus, or another type of communications interface. Communications interface 302 may be used by the other components of virtual machine host 300 to communicate with other devices and systems in, and external to, the virtualization services platform.

Failure determiner 304 may detect failures in physical HBAs (e.g., primary physical HBA 120 and/or backup physical HBA 130, both of FIGS. 1 and 2) on a virtualization services platform (e.g., virtualization services platform 110 of FIGS. 1 and 2.). In some implementations, failure determiner 304 may, via communications interface 302, may receive asynchronous notifications from physical HBAs on the virtualization services platform, and may detect failures in the physical HBAs based on the received asynchronous notifications. For example, failure determiner 304 may receive an asynchronous notification from a physical HBA that includes an event identifying an I/O request failure and a reason for the failure. Failure determiner 304 may determine that the physical HBA has failed since it was unable to process an I/O request. In some implementations, failure determiner 304 may determine that the physical HBA has failed in response to a quantity of received I/O request failure events exceeding a threshold quantity of I/O request failure events. For example, failure determiner 304 may maintain a threshold of two I/O request failure events and determine that a physical HBA has failed in response to determining that failure determiner 304 has received three I/O request failure events from the physical HBA. In response to detecting a failure, failure determiner 304 may, via communications interface 302, may return non-retriable error notifications for I/O requests received prior to the detecting.

Queue manager 306 may manage queues of I/O requests issued by virtual machine guests (e.g., virtual machine guest 110 of FIGS. 1 and 2) on the virtualization services platform. For example, queue manager 306 may, in response to failure determiner 304 detecting a failure in a physical HBA, place incoming I/O requests from the virtual machine guest into a wait queue. Once virtual HBA ports on the failed physical HBA have been migrated to a backup physical HBA, queue manager 306 may transfer the incoming I/O requests in the wait queue to an active queue to be processed using the virtual HBA ports registered on the backup physical HBA.

Port migrator 308 may, in response to failure determiner 304 detecting a failure in a physical HBA, migrate virtual HBA ports on the failed physical HBA to a backup physical HBA. Port migrator 308 may migrate the virtual HBA ports by unregistering the virtual HBA ports from the failed physical HBA and register the virtual HBA ports onto the backup physical HBA. Once the migration is completed, port migrator 308, via communications interface 302, may provide a notification to the virtual machine that the virtual HBA ports are back online and available. In some implementations, port migrator 308 may, in response to determining that unregistering of the virtual HBA ports from the failed physical HBA could not be completed successfully, provide instructions to the failed physical HBA to reset the failed physical HBA.

Virtual machine configuration database manager 310 may, after port migrator 308 has migrated virtual HBA ports from a failed physical HBA to a backup physical HBA, update a mapping of the virtual HBA ports in a virtual machine configuration database (e.g., virtual machine configuration database 150 of FIGS. 1 and 2) to reflect the migration.

Figure 4:
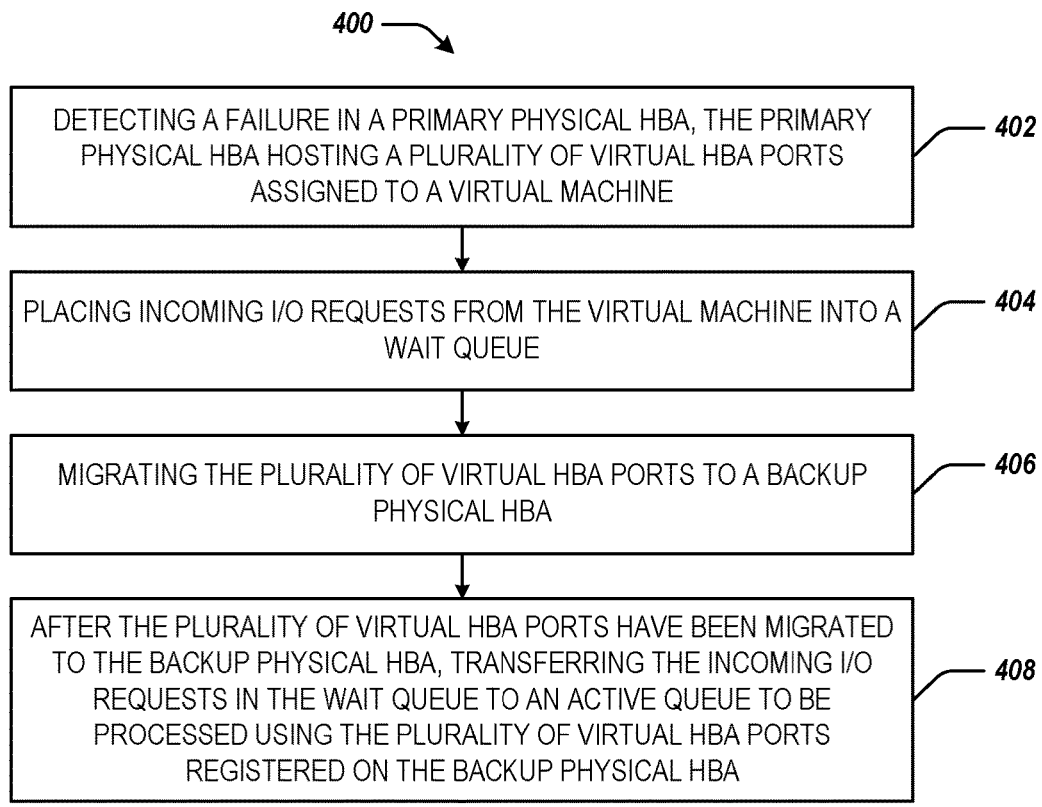
FIG. 4 is an example flow diagram depicting an example method for virtual Fibre Channel port migration.

FIG. 4 is a flowchart depicting an example method 400 for virtual Fibre Channel port migration. Method 400 may be executed or performed, for example, by some or all of the system components described above in virtualization services platform 100 of FIGS. 1 and 2, and/or virtual machine host 300 of FIG. 3. Method 400 may be implemented in the form of executable instructions stored on at least one machine-readable storage medium of a system and executed by at least one processor of the system. Alternatively or in addition, method 400 may be implemented in the form of electronic circuitry (e.g., hardware). In some examples, steps of method 400 may be executed substantially concurrently or in a different order than shown in FIG. 4. In some examples, method 400 may include more or less steps than are shown in FIG. 4. In some examples, some of the steps of method 400 may, at certain times, be ongoing and/or may repeat.

At block 402, method 400 may include detecting a failure in a primary physical HBA hosting a plurality of virtual HBA ports assigned to a virtual machine. As an example, virtual machine host 140 of virtualization services platform 100 illustrated in FIGS. 1 and 2, and/or failure determiner 304 of virtual machine host 300 illustrated in FIG. 3 may be responsible for implementing block 402. In some implementations, detecting a failure in the primary physical HBA may be performed based on an asynchronous notification received from the primary physical HBA. In some implementations, the asynchronous notification may be an event identifying a reason for the failure or a failed I/O return notification.

At block 404, method 400 may include, in response to the detecting at block 402, placing incoming I/O requests from the virtual machine into a wait queue. As an example, virtual machine host 140 of virtualization services platform 100 illustrated in FIGS. 1 and 2, and/or queue manager 306 of virtual machine host 300 illustrated in FIG. 3 may be responsible for implementing block 404. In some implementations, the incoming I/O requests may be requests to access a storage device behind the plurality of virtual HBA ports.

At block 406, method 400 may include, in response to the detecting at block 402, migrating the plurality of virtual HBA ports to a backup physical HBA. As an example, virtual machine host 140 of virtualization services platform 100 illustrated in FIGS. 1 and 2, and/or port migrator 308 of virtual machine host 300 illustrated in FIG. 3 may be responsible for implementing block 406.

At block 408, method 400 may include, after the plurality of virtual HBA ports have been migrated to the backup physical HBA, transferring the incoming I/O requests in the wait queue to an active queue to be processed using the plurality of virtual HBA ports registered on the backup physical HBA. As an example, virtual machine host 140 of virtualization services platform 100 illustrated in FIGS. 1 and 2, and/or queue manager 306 of virtual machine host 300 illustrated in FIG. 3 may be responsible for implementing block 408.

Figure 5:
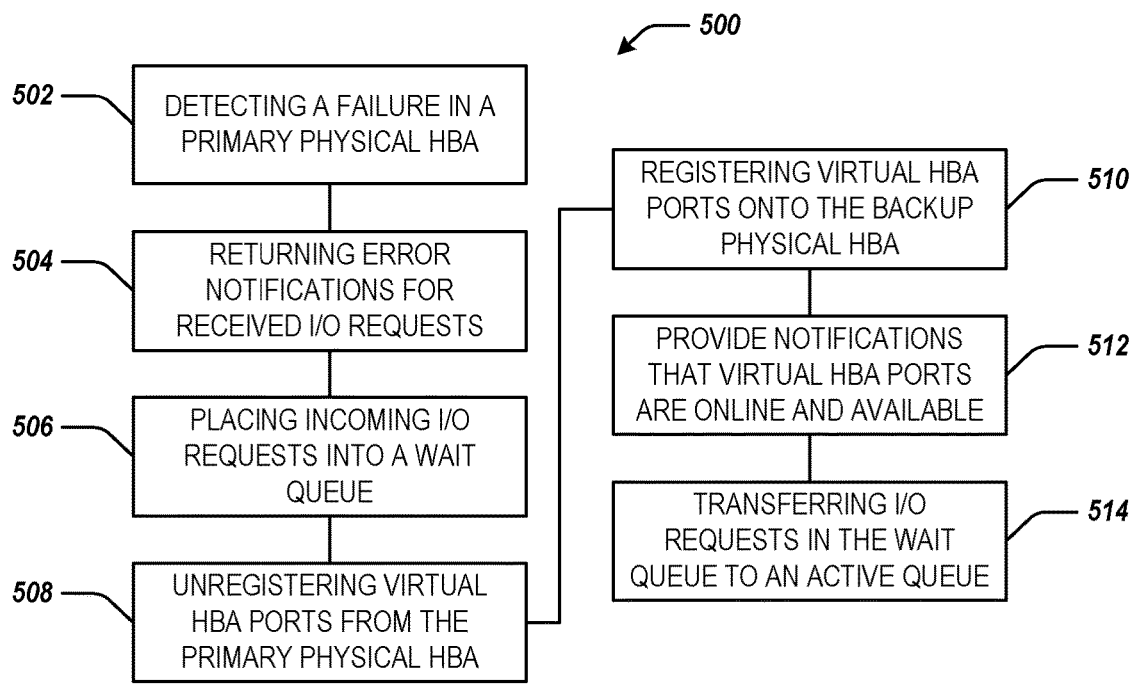
FIG. 5 is an example flow diagram depicting an example method for virtual Fibre Channel port migration.

FIG. 5 is a flowchart depicting an example method 400 for virtual Fibre Channel port migration. Method 500 may be executed or performed, for example, by some or all of the system components described above in virtualization services platform 100 of FIGS. 1 and 2, and/or virtual machine host 300 of FIG. 3. Method 500 may be implemented in the form of executable instructions stored on at least one machine-readable storage medium of a system and executed by at least one processor of the system. Alternatively or in addition, method 500 may be implemented in the form of electronic circuitry (e.g., hardware). In some examples, steps of method 500 may be executed substantially concurrently or in a different order than shown in FIG. 5. In some examples, method 500 may include more or less steps than are shown in FIG. 5. In some examples, some of the steps of method 500 may, at certain times, be ongoing and/or may repeat.

At block 502, method 500 may include detecting a failure in a primary physical HBA hosting a plurality of virtual HBA ports assigned to a virtual machine. As an example, virtual machine host 140 of virtualization services platform 100 illustrated in FIGS. 1 and 2, and/or failure determiner 304 of virtual machine host 300 illustrated in FIG. 3 may be responsible for implementing block 502. In some implementations, detecting a failure in the primary physical HBA may be performed based on an asynchronous notification received from the primary physical HBA. In some implementations, the asynchronous notification may be an event identifying a reason for the failure or a failed I/O return notification.

At block 504, method 500 may include, in response to the detecting at block 502, returning non-retriable error notifications for I/O requests received prior to the detecting. As an example, virtual machine host 140 of virtualization services platform 100 illustrated in FIGS. 1 and 2, and/or communications interface 302 of virtual machine host 300 illustrated in FIG. 3 may be responsible for implementing block 504. In some implementations, the received I/O requests may be requests to access a storage device behind the plurality of virtual HBA ports.

At block 506, method 500 may include, in response to the detecting at block 502, placing incoming I/O requests from the virtual machine into a wait queue. As an example, virtual machine host 140 of virtualization services platform 100 illustrated in FIGS. 1 and 2, and/or queue manager 306 of virtual machine host 300 illustrated in FIG. 3 may be responsible for implementing block 506. In some implementations, the incoming I/O requests may be requests to access a storage device behind the plurality of virtual HBA ports.

At block 508, method 500 may include, in response to the detecting at block 502, unregistering the plurality of virtual HBA ports from the primary physical HBA. As an example, virtual machine host 140 of virtualization services platform 100 illustrated in FIGS. 1 and 2, and/or port migrator 308 of virtual machine host 300 illustrated in FIG. 3 may be responsible for implementing block 508. In some implementations, in response to determining that unregistering of the plurality of virtual HBA ports from the primary physical HBA could not be completed successfully, instructions may be provided to the primary physical HBA to reset the primary physical HBA.

At block 510, method 500 may include, in response to the detecting at block 502, registering the plurality of virtual HBA ports onto the backup physical HBA. As an example, virtual machine host 140 of virtualization services platform 100 illustrated in FIGS. 1 and 2, and/or port migrator 308 of virtual machine host 300 illustrated in FIG. 3 may be responsible for implementing block 510.

At block 512, method 500 may include, after the plurality of virtual HBA ports have been migrated to the backup physical HBA, providing a notification to the virtual machine that the plurality of virtual HBA ports are back online and available. As an example, virtual machine host 140 of virtualization services platform 100 illustrated in FIGS. 1 and 2, and/or communications port 302 of virtual machine host 300 illustrated in FIG. 3 may be responsible for implementing block 512.

At block 514, method 500 may include, after the plurality of virtual HBA ports have been migrated to the backup physical HBA, transferring the incoming I/O requests in the wait queue to an active queue to be processed using the plurality of virtual HBA ports registered on the backup physical HBA. As an example, virtual machine host 140 of virtualization services platform 100 illustrated in FIGS. 1 and 2, and/or queue manager 306 of virtual machine host 300 illustrated in FIG. 3 may be responsible for implementing block 514. In some implementations, after the plurality of virtual HBA ports have been registered to the backup physical HBA, a mapping of the plurality of virtual HBA ports in a virtual machine configuration database may be updated.

Figure 6:
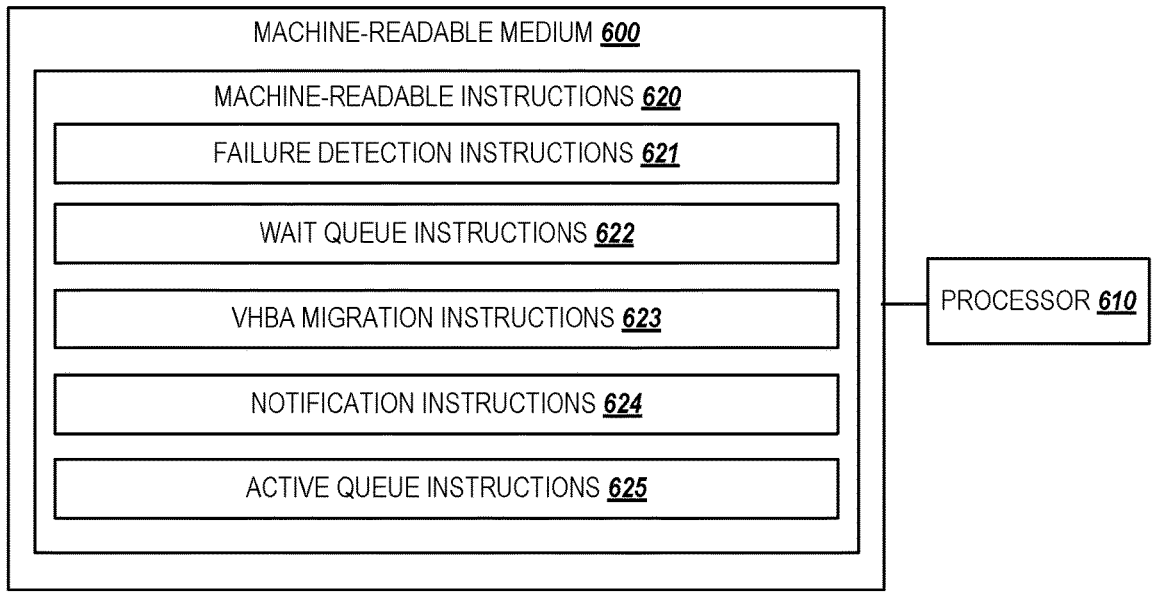
FIG. 6 is a block diagram of an example machine-readable medium for virtual Fibre Channel port migration.

FIG. 6 is a block diagram of an example machine-readable medium 600 for virtual Fibre Channel port migration. Machine-readable medium 600 may be communicatively coupled to a processor 610. Machine-readable medium 600 and processor 610 may, for example, be included as virtualization services platform 100 illustrated in FIG. 1 and/or virtual machine host 300 illustrated in FIG. 3. For example, machine-readable medium 600 and processor 610 may be included in virtual machine host 140 of FIG. 1. Although the following descriptions refer to a single processor and a single machine-readable storage medium, the descriptions may also apply to a system with multiple processors and/or multiple machine-readable storage mediums. In such examples, the instructions may be distributed (e.g., stored) across multiple machine-readable storage mediums and the instructions may be distributed (e.g., executed by) across multiple processors.

Processor 610 may be central processing units (CPUs), microprocessors, and/or other hardware devices suitable for retrieval and execution of instructions stored in machine-readable storage medium 600. In the example shown in FIG. 6, processor 610 may fetch, decode, and execute machine-readable instructions 620 (including instructions 621-625) for virtual Fibre Channel port migration. As an alternative or in addition to retrieving and executing instructions, processor 610 may include electronic circuits comprising a number of electronic components for performing the functionality of the instructions in machine-readable storage medium 600. With respect to the executable instruction representations (e.g., boxes) described and shown herein, it should be understood that part or all of the executable instructions and/or electronic circuits included within one box may, in some examples, be included in a different box shown in the figures or in a different box not shown.

Machine-readable storage medium 600 may be any electronic, magnetic, optical, or other physical storage device that stores executable instructions. Thus, machine-readable storage medium 600 may be, for example, Random Access Memory (RAM), a nonvolatile RAM (NVRAM) (e.g., RRAM, PCRAM, MRAM, etc.), an Electrically-Erasable Programmable Read-Only Memory (EEPROM), a flash memory, a storage drive, an optical disc, and the like. Machine-readable storage medium 600 may be disposed within a virtual machine host (e.g., virtual machine host 140 of FIGS. 1 and 2, virtual machine host 300 of FIG. 3, etc.). In this situation, the executable instructions may be "installed" on the virtual machine host. Alternatively, machine-readable storage medium 600 may be a portable, external or remote storage medium, for example, that allows a virtual machine host to download the instructions from the portable/external/remote storage medium. In this situation, the executable instructions may be part of an "installation package". As described herein, machine-readable storage medium 600 may be encoded with executable instructions for virtual Fibre Channel port migration.

Referring to FIG. 6, failure detection instructions 621, when executed by a processor (e.g., 610), may cause the processor to detect a failure in a primary physical HBA hosting a plurality of virtual HBA ports assigned to a virtual machine. In some implantations, failure detection instructions 621, when executed by the processor, may cause the processor to, in response to detecting the failure, return non-retriable error notifications for I/O requests received prior to detecting the failure. The I/O requests may be requests to access a storage device behind the plurality of virtual HBA ports.

Wait queue instructions 622, when executed by a processor (e.g., 610), may cause the processor to, in response to detecting the failure, place incoming I/O requests from the virtual machine into a wait queue.

Virtual HBA migration instructions 623, when executed by a processor (e.g., 610), may cause the processor to, in response to detecting the failure, migrate the plurality of virtual HBA ports to a backup physical HBA. In some implementations, virtual HBA migration instructions 623, when executed by the processor, may cause the processor to migrate the plurality of virtual HBA ports to the backup physical HBA by unregistering the plurality of virtual HBA ports from the primary physical HBA and registering the plurality of virtual HBA ports onto the backup physical HBA. In some implementations, virtual HBA migration instructions 623, when executed by the processor, may cause the processor to, in response to determining that unregistering of the plurality of virtual HBA ports from the primary physical HBA could not be completed successfully, provide instructions to the primary physical HBA to reset the primary physical HBA.

Notification instructions 624, when executed by a processor (e.g., 610), may cause the processor to, after the plurality of virtual HBA ports have been migrated to the backup physical HBA, provide a notification to the virtual machine that the plurality of virtual HBA ports are back online and available.

Active queue instructions 625, when executed by a processor (e.g., 610), may cause the processor to, after the plurality of virtual HBA ports have been migrated to the backup physical HBA, transfer the incoming I/O requests in the wait queue to an active queue to be processed using the plurality of virtual HBA ports registered on the backup physical HBA.

Figure 7:
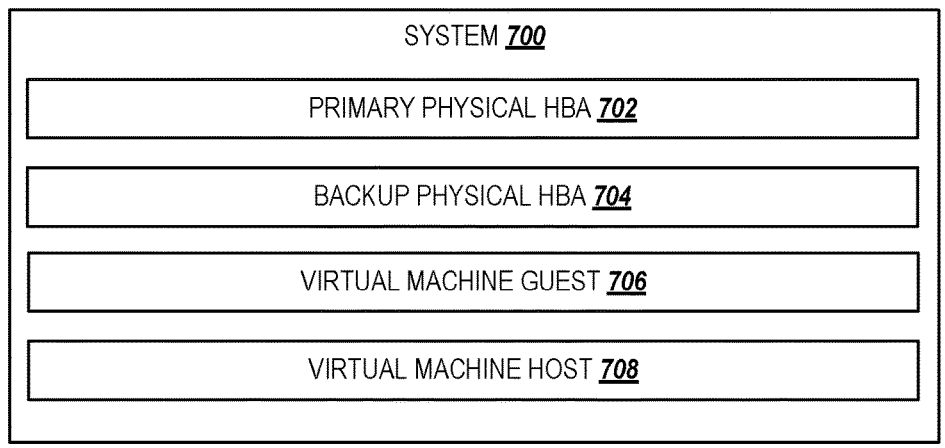
FIG. 7 is a block diagram of an example system for virtual Fibre Channel port migration.

FIG. 7 is a block diagram depicting an example system 700 for virtual Fibre Channel port migration. In some implementations, system 700 may include a primary physical HBA 702, a backup physical HBA 704, a virtual machine guest 706, and a virtual machine host 708. In some examples, system 700 may be implemented by virtualization services platform 100 of FIG. 1.

Primary physical HBA 702, backup physical HBA 704, virtual machine guest 706, and virtual machine host 708 may each be implemented by a combination of hardware and programming that performs a designated function or set of functions. For example, the hardware of primary physical HBA 702, backup physical HBA 704, virtual machine guest 706, and virtual machine host 708 may include a processor or both a processor and a machine-readable storage medium, while the programming may include instructions and/or code stored on the machine-readable storage medium that may be executable by the processor to perform the designated function(s).

In some implementations, virtual machine host 708 may include a processor and program instructions that, when executed, cause the processor to detect a failure in primary physical HBA 702, which may be hosting a plurality of virtual HBA ports assigned to virtual machine guest 706. In some implementations, the program instructions of virtual machine host 708, when executed, may cause the processor of virtual machine host 708 to detect failures in primary physical HBA 702 based on an asynchronous notification, such as a failed I/O return notification or an event identifying a reason for the failure, received from primary physical HBA 702. In some implementations, the program instructions of virtual machine host 708, when executed, may cause the processor of virtual machine host 708 to, in response to the detecting, return non-retriable error notifications (e.g., NON-RETRIABLE HBA FATAL error) for I/O requests received prior to the detecting.

In some implementations, virtual machine host 708 may include a processor and program instructions that, when executed, cause the processor to, in response to detecting the failure, place incoming I/O requests from virtual machine 706 into a wait queue, unregister the plurality of virtual HBA ports from primary physical HBA 702, and register the plurality of virtual HBA ports onto backup physical HBA 704. In some implementations, the program instructions of virtual machine host 708, when executed, may cause the processor of virtual machine host 708 to in response to determining that unregistering of the plurality of virtual HBA ports from primary physical HBA 702 could not be completed successfully, provide instructions to primary physical HBA 702 to reset primary physical HBA 702.

In some implementations, virtual machine host 708 may include a processor and program instructions that, when executed, cause the processor to, after the plurality of virtual HBA ports have been registered to backup physical HBA 704, transfer the incoming I/O requests in the wait queue to an active queue to be processed using the plurality of virtual HBA ports registered on backup physical HBA 704. In some implementations, the program instructions of virtual machine host 708, when executed, may cause the processor of virtual machine host 708 to, after the plurality of virtual HBA ports have been registered to backup physical HBA 704, provide a notification to virtual machine 706 that the plurality of virtual HBA ports are back online and available. In some implementations, the program instructions of virtual machine host 708, when executed, may cause the processor of virtual machine host 708 to, after the plurality of virtual HBA ports have been registered to backup physical HBA 704, update a mapping of the plurality of virtual HBA ports in a virtual machine configuration database.

The foregoing disclosure describes a number of example implementations for virtual Fibre Channel port migration. The disclosed examples may include systems, devices, machine-readable storage media, and methods for virtual Fibre Channel port migration. For purposes of explanation, certain examples are described with reference to the components illustrated in FIGS. 1-3, 6, and 7. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 4 and 5 are examples and is not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for virtual Fibre Channel port migration, the method performed by a processor and comprising:
   detecting a failure in a primary physical host bus adapter (HBA), the primary physical HBA hosting a plurality of virtual HBA ports assigned to a virtual machine;
   in response to the detecting:
      placing incoming input/output (I/O) requests from the virtual machine into a wait queue; and
      migrating the plurality of virtual HBA ports to a backup physical HBA;
      in response to determining that unregistering of the plurality of virtual HBA ports from the primary physical HBA could not be completed successfully, providing instructions to the primary physical HBA to reset the primary physical HBA; and
   after the plurality of virtual HBA ports have been migrated to the backup physical HBA, transferring the incoming I/O requests in the wait queue to an active queue to be processed using the plurality of virtual HBA ports registered on the backup physical HBA.

2. The method of claim 1, wherein detecting a failure in the primary physical HBA comprises:
   detecting a failure in the primary physical HBA based on an asynchronous notification received from the primary physical HBA.

3. The method of claim 2, wherein the asynchronous notification comprises an event identifying a reason for the failure.

4. The method of claim 1, wherein migrating the plurality of virtual HBA ports to the backup physical HBA comprises:
   unregistering the plurality of virtual HBA ports from the primary physical HBA; and
   registering the plurality of virtual HBA ports onto the backup physical HBA.

5. The method of claim 1, comprising:
   in response to the detecting, returning non-retriable error notifications for I/O requests received prior to the detecting.

6. The method of claim 1, comprising:
   after the plurality of virtual HBA ports have been migrated to the backup physical HBA, providing a notification to the virtual machine that the plurality of virtual HBA ports are back online and available.

7. The method of claim 1, wherein the incoming I/O requests are requests to access a storage device behind the plurality of virtual HBA ports.

8. A virtualization services system, comprising:
a primary physical host bus adapter (HBA);
a backup physical HBA;
a virtual machine guest; and
a virtual machine host to:
   detect a failure in the primary physical HBA, the primary physical HBA hosting a plurality of virtual HBA ports assigned to the virtual machine;
   in response to detecting the failure:
      place incoming input/output (I/O) requests from the virtual machine into a wait queue;
      unregister the plurality of virtual HBA ports from the primary physical HBA;
      in response to determining that unregistering of the plurality of virtual HBA ports from the primary physical HBA could not be completed successfully, provide instructions to reset the primary physical HBA;
      register the plurality of virtual HBA ports onto the backup physical HBA; and
   after the plurality of virtual HBA ports have been registered to the backup physical HBA, transfer the incoming I/O requests in the wait queue to an active queue to be processed using the plurality of virtual HBA ports registered on the backup physical HBA.

9. The virtualization services system of claim 8, wherein the virtual machine host is to:
   in response to detecting the failure, receive a notification of the failure through an event.

10. The virtualization services system of claim 8, wherein the virtual machine host is to:
   detect a failure in the primary physical HBA based on an asynchronous notification received from the primary physical HBA.

11. The virtualization services system of claim 10, wherein the asynchronous notification comprises a failed I/O return notification.

12. The virtualization services system of claim 8, wherein the virtual machine host is to:
   after the plurality of virtual HBA ports have been registered to the backup physical HBA, provide a notification to the virtual machine that the plurality of virtual HBA ports are back online and available.

13. The virtualization services system of claim 8, wherein the incoming I/O requests are requests to access a storage device behind the plurality of virtual HBA ports.

14. The virtualization services system of claim 8, wherein the virtual machine host is to:
   after the plurality of virtual HBA ports have been registered to the backup physical HBA, update a mapping of the plurality of virtual HBA ports in a virtual machine configuration database.

15. A non-transitory machine-readable storage medium comprising instructions for virtual Fibre Channel port migration, the instructions executable by a processor to:
   detect a failure in a primary physical host bus adapter (HBA), the primary physical HBA hosting a plurality of virtual HBA ports assigned to a virtual machine;
   in response to detecting the failure:
      place incoming input/output (I/O) requests from the virtual machine into a wait queue;
      migrate the plurality of virtual HBA ports to a backup physical HBA, including unregistering the plurality of virtual HBA ports from the primary physical HBA; and
      in response to determining that unregistering of the plurality of virtual HBA ports from the primary physical HBA could not be completed successfully, provide instructions to the primary physical HBA to reset the primary physical HBA;
   after the plurality of virtual HBA ports have been migrated to the backup physical HBA:
      provide a notification to the virtual machine that the plurality of virtual HBA ports are back online and available; and
      transfer the incoming I/O requests in the wait queue to an active queue to be processed using the plurality of virtual HBA ports registered on the backup physical HBA.

16. The non-transitory machine-readable storage medium of claim 15, wherein the instructions are executable by the processor to migrate the plurality of virtual HBA ports to the backup physical HBA by:
   registering the plurality of virtual HBA ports onto the backup physical HBA.

17. The non-transitory machine-readable storage medium of claim 15, wherein the instructions are executable by the processor to:
   in response to detecting the failure, return non-retriable error notifications for I/O requests received prior to detecting the failure.

18. The method of claim 1, comprising:
   determining that unregistering of the plurality of virtual HBA ports from the primary physical HBA could not be completed successfully by receiving a return status indicating an unsuccessful attempt.

19. The virtualization services system of claim 8, wherein the virtual machine host is to:
   determine whether unregistering of the plurality of virtual HBA ports from the primary physical HBA can be completed successfully.

20. The non-transitory machine-readable storage medium of claim 15, wherein the instructions are executable by the processor to:
   determine that unregistering of the plurality of virtual HBA ports from the primary physical HBA could not be completed successfully by receiving a time out in processing the request.

* * * * *